United States Patent [19]
Seesselberg

[11] 3,821,937
[45] July 2, 1974

[54] COOLING OF LOW-INERTIA MOTOR DRIVEN DIRECT DRIVE SEWING MACHINE

[75] Inventor: Henry A. Seesselberg, South Plainfield, N.J.

[73] Assignee: The Singer Company, New York, N.Y.

[22] Filed: Dec. 18, 1972

[21] Appl. No.: 316,149

[52] U.S. Cl.............. 112/218 R, 112/220, 310/58
[51] Int. Cl............................................ D05b 71/00
[58] Field of Search............ 112/218 R, 220, 219 R; 310/58, 63, 52

[56] References Cited
UNITED STATES PATENTS

| | | | |
|---|---|---|---|
| 1,599,065 | 9/1926 | Rudenberg | 310/58 |
| 2,210,692 | 8/1940 | Stokes | 310/58 |
| 3,698,334 | 10/1972 | Kleinschmidt et al. | 112/220 |
| 3,715,610 | 2/1973 | Brinkman | 310/58 |

*Primary Examiner*—H. Hampton Hunter
*Attorney, Agent, or Firm*—Marshall J. Breen; Chester A. Williams, Jr.; Joel Halpern

[57] ABSTRACT

A direct drive sewing machine driven by a sealed low-inertia motor having a combination of elements adapted to provide for temperature control of the motor and certain operator accessible and auxiliary elements of the sewing machine. The motor is enclosed in end bonnets which are provided with cooling air entrance and exit openings. A blower external to the motor and operable independently thereof produces a continuous stream of cooling air regardless of the intermittent operation of the motor, which stream of air is directed through the entrance openings of the end bonnets and in close proximity to the motor shaft-bearing end plates of the motor within said end bonnets. The cooling air is then exhausted through the exit openings.

10 Claims, 3 Drawing Figures

COOLING OF LOW-INERTIA MOTOR DRIVEN DIRECT DRIVE SEWING MACHINE

BACKGROUND OF THE INVENTION

It was heretofore conventional practice to drive sewing machines, particularly those of the industrial type, by means of an induction motor having the appropriate rated horsepower. Such motors contained an integral flywheel and a clutch-brake mechanism. Rapid acceleration was obtained through the storage of kinetic energy in the flywheel, and the transfer of this energy was effected by means of clutch engagement with an output shaft, which in turn, was connected to the sewing machine drive shaft through a belt and pulley arrangement. Intermittent motion and variable speed were controlled by the sewing machine operator through slippage of the clutch. Stopping was controlled by a friction brake.

Recognizing a number of disadvantages in the foregoing system, not the least of which was excessive vibration due to flywheel imbalance, frequent replacement of clutches, brakes and belts, and the necessity for continuous motor operation even when the sewing machine was idle, a family of low-inertia, moving-coil and surface wound armature DC motors was recently introduced and have made possible the elimination of the previous belt, pulley and clutch system.

The low-inertia DC motor is coupled directly to the shaft of the sewing machine and, due to the extremely rapid acceleration and deceleration characteristics of this system and its responsiveness to simple operator control, the acceptance of direct drive sewing machines has been immediate and widespread. In sewing applications where frequency closely spaced starts and stops are required, as is customary in industrial sewing, the direct drive sewing machine driven by the low-inertia motor is ideal. The sewing machine may be rapidly accelerated to top speed and is capable of performing more stitches per unit time during this period than the older belt and pulley systems. A suitable motor for such direct drive sewing machines is disclosed in Swiggett U.S. Pat. No. 2,970,238 and an appropriate motor control system is disclosed in the Seesselberg et. al. U.S. Pat. No. 3,597,672.

However, since the advent of the low-inertia motor direct drive sewing machine system, it has been found that temperature rise problems have become more acute. Such problems are twofold; i.e., operator comfort problems and motor destruction problems. In respect of this latter aspect, the use of printed circuit motors has led to the requirement that armature temperature should not exceed 150°C in order to avoid rapid deterioration and failure of the motor. Further, the handwheel of the machine as well as certain other operator accessible assemblies and certain control apparatus are generally positioned in fairly close proximity to the motor. As a result, these assemblies are unduly heated and create intolerable discomfort for the machine operator. Where needle positioning sensing and control apparatus is excessively heated, operational failure of such equipment is frequently occasioned, one reason being the susceptibility of the semiconductors in the sensor assembly to overheating. Another source of heat generation which has been found to adversely affect the motor is in the region of the overheated motor bearings.

One prior attempt to overcome the heat rise problem involved the mounting of an impeller directly on the motor shaft either at the coupling to the sewing head of the machine, or on the handwheel side. Air was moved across the motor whenever the head was operating. However, although temperature drops of from 8°–15°C were obtained, the motors were still often found to be too hot for operator comfort and were only marginally safe in terms of motor material stability.

SUMMARY OF THE INVENTION

It is, therefore, one object of the present invention to provide a method for cooling a sealed, low-inertia, direct drive sewing machine motor which permits the maintenance of operating temperatures within limits which are consistent with the requirements for operator comfort and motor longevity.

It is another object of this invention to provide a method for cooling a sealed, low-inertia, direct drive sewing machine motor whereby the motor and certain motor-driven auxiliary sewing machine assemblies are simultaneously cooled.

It is a further object of this invention to provide a low-inertia motor driven direct drive sewing machine having a combination of means associated therewith for maintaining the motor temperature within limits which are consistent with the requirements for desired motor longevity.

It is yet another object of this invention to provide a low-inertia motor driven direct drive sewing machine having a combination of means associated therewith for maintaining the temperature of the motor and of certain auxiliary sewing machine assemblies within limits which are consistent with the requirements for operator comfort and motor longevity.

Still a further object of the invention is the provision of a direct drive sewing machine driven by a low-inertia motor in which the motor as well as auxiliary elements associated with the machine are cooled by means of a system which does not require frequent monitoring and replacement of filters.

According to the present invention, there is provided a method for cooling a sealed low-inertia, direct drive sewing machine motor, comprising producing a continuous stream of cooling air by means operable independently of said motor, directing said stream through entrance openings located respectively in end bonnets surrounding each of the motor end plates, causing the stream of cooling air in each end bonnet to flow in close proximity to the motor end plate therein and to exit through another opening in said end bonnet.

According to the present invention, there is also provided in a direct drive sewing machine having means associated therewith for cooling the low-inertia driving motor, said motor being of the sealed type and mounted on the longitudinal arm of the machine such that the shaft of said motor is coupled operatively to the main machine drive shaft, and said motor being sealed by a pair of opposed end plates in which said motor shaft is rotatably carried, the combination of an end bonnet enclosing each of said end plates and provided at diverse locations with cooling air entrance and exit openings, a blower external of said motor and operable independently thereof so as to supply a continuous stream of cooling air to each of said end bonnets regardless of intermittent operation of said motor and cooling air distribution means connecting said blower with the entrance openings of said end bonnets.

It has been found desirable to provide such entrance and exit openings in the form of arcuate slots. Preferably, the entrance and exit slots are formed in the end bonnets at opposed locations. However, it will be understood that openings having other configurations may be utilized. Since cooling of the motor shaft bearings is an important consideration, the location and configuration of the entrance and exit openings should be selected to provide for an adequate flow of cooling air over such bearings.

Further, it has been found advantageous to mount certain sewing machine assemblies in the end bonnets which enclose the motor. For example, it has been found desirable to enclose the coupling and braking mechanisms within one of the end bonnets and a sewing machine needle position sensor control unit in the other end bonnet. The invention also makes possible the use of a cooling air supply stream which does not have to undergo prior filtration or carefully monitored ongoing filtration.

BRIEF DESCRIPTION OF THE DRAWINGS

In order that the invention may be more fully understood, it will now be described, by way of example, with reference to the accompanying drawings in which.

DESCRIPTION OF THE INVENTION

Figure 1:
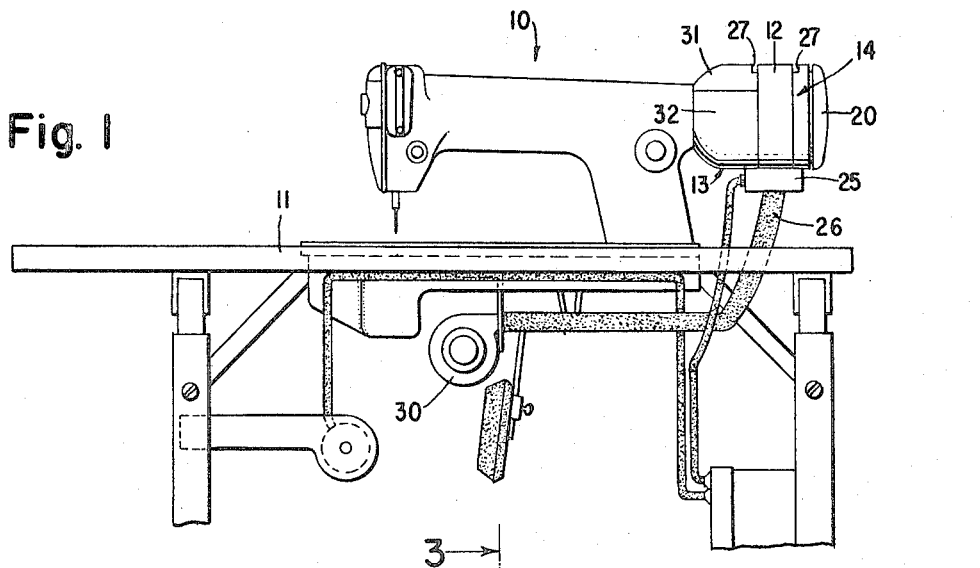
FIG. 1 is a front elevational view of a direct drive sewing machine embodying the features of this invention.

Referring to the accompanying drawings, and particularly to FIG. 1 thereof, there is shown a sewing machine 10 of the direct drive type mounted on table 11. A low-inertia motor 12 is mounted between end bonnets 13, 14 the overall assembly being secured to the frame of the machine by means of screws 19 which extend through end bonnet 13. Secured to the shaft 15 of the motor is a coupling device 16 adapted to operatively connect the motor shaft with the longitudinal arm shaft 17 of the sewing machine. The coupling device is positioned within end bonnet 13 and is of conventional construction. Mounted also within end bonnet 13 is the customary braking mechanism 18 for shaft 15 controllable through clutch 29. As shown in the drawings, end bonnet 13 comprises separable sections 31 and 32. The upper section 31 is utilized as the bobbin winder base and is adapted to support the bobbin winder of the machine. The lower section 32 serves as a support for mounting the bobbin winder base and completes the enclosure for the motor and the aforementioned coupling device, brake and clutch. It will be appreciated, however, that this end bonnet may be made in one piece and need not provide a base for the bobbin winder.

Figure 2:
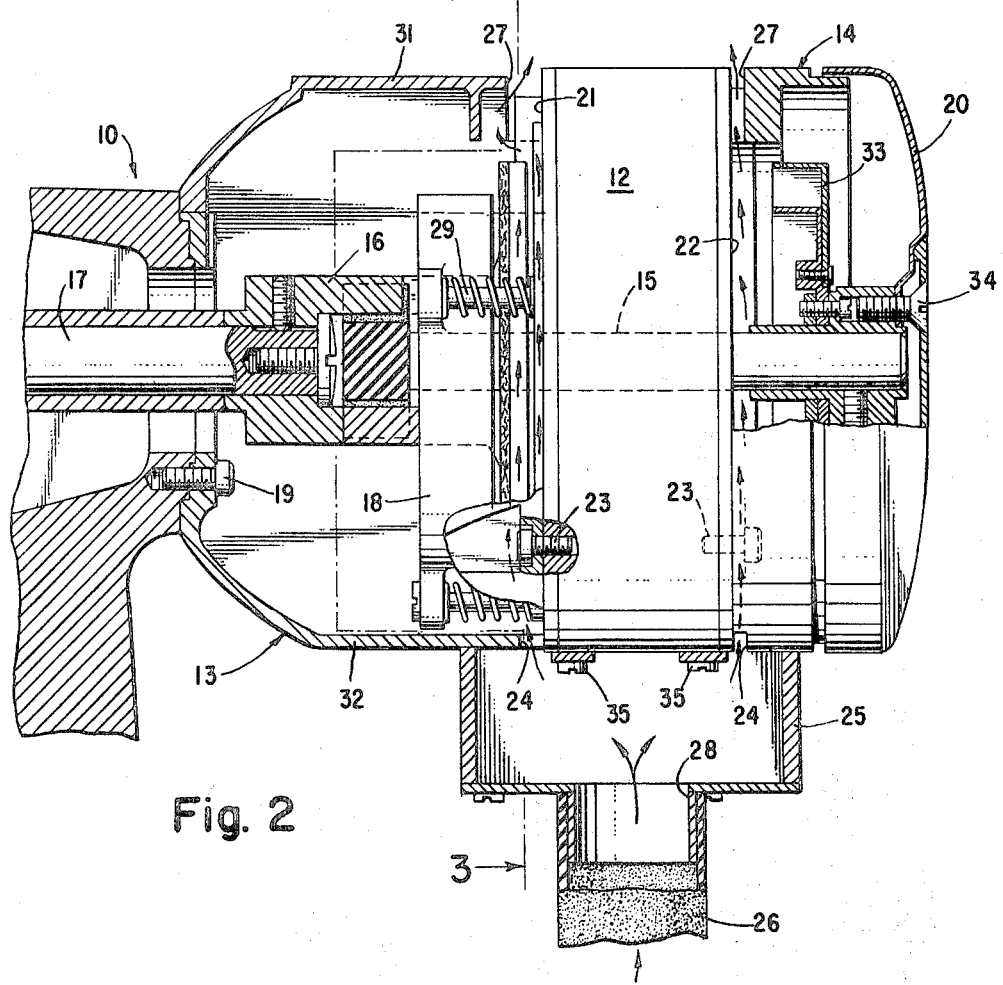
FIG. 2 is a side elevational view of the motor and enclosing end bonnets, partly in section.

As will be seen more clearly from FIG. 2, the right end bonnet 14 encloses a needle position sensor assembly generally referred to by reference numeral 33. Its operation is well known to persons skilled in the sewing machine art. A handwheel 20 is mounted at the end of motor shaft 15 and is secured thereto by fastening means such as screws 34. The handwheel serves as an end cap for end bonnet 14. The handwheel may be formed of a lightweight material such as sheet metal. As shown, the peripheral portion of the handwheel encloses the terminal portion of end bonnet 14. However, the clearance between the peripheral portion of the handwheel and the underlying extension of end bonnet 14 is desirably of sufficient dimension to service the ejection of lint and other debris which may be accumulated within the end bonnet and be moved centrifugally by the sensor shutters.

The motor is provided with two end plates 21, 22 each of which seals one end of the motor. A central aperture is provided in each of the end plates and motor shaft 15 extends therethrough and is rotatably supported by the end plates in any suitable manner, such as by a close running fit or by a ball bearing assembly (not shown). Preferably, a bearing assembly is utilized. The end bonnets 13, 14 are fixedly secured to the end plates such as by a plurality of circumferentially spaced screws 23.

Each of the end bonnets is formed with an entrance opening desirably in the form of a slot 24, preferably of arcuate configuration, in a portion thereof adjacent the end plate housed therewithin. This slot may be formed by providing a notched portion in the end bonnet adjacent the end plate. In cooperation with the surface of the end plate, a slot is thus defined. As shown, a junction box 25 is arranged across the bottom of the motor and both end bonnets. The upper portion of the junction box is open to slots 24 and the lower portion is provided with an inlet opening 28 so that a cooling air conduit or hose 26 may be connected for the introduction of a continuous stream of cooling air. The junction box is open at its top and is secured in place by means such as screws 35 which may be threadedly received by holes tapped either in the motor or in the end bonnets. The junction box tends to function as a manifold chamber, the cooling air introduced thereto then dividing into separate segments which pass respectively into the end bonnets 13 and 14, via the entrance slots.

The upper portion of each end bonnet is provided with an exit opening desirably in the form of a slot 27 to accommodate discharge of the cooling air after it has traversed the end bonnet in relatively close proximity to the end plate and motor bearing therein. Again, as with entrance slot 24, the end bonnet may be provided with a notched portion which cooperates with the adjacent surface of the end plate to form the slot.

End bonnet 13, as stated above, encloses the coupling device 16 as well as the braking mechanism 18 which may be of any known construction, so that detailed description herein is unnecessary. A spring clutch arrangement for control of the braking mechanism is identified by reference numeral 29 and is also of known construction. As stated above, end bonnet 14 serves to enclose the needle position sensor control unit. Preferably, this unit operates with a sensor assembly which utilizes semiconductors. It has been found that a number of such sensor assembly failures stem from the overheating of the semiconductors. The needle-position sensor assembly is, according to the invention, located within end bonnet 14 in such relation to the flow of cooling air therethrough that such apparatus is maintained at a temperature where damage to the semiconductors due to overheating is substantially avoided. One advantage which results from positioning the sensor assembly in the illustrated location is that any accumulation of lint and other debris in the end bonnet 14 is wiped and spun continuously outwardly for ejection through the clearance space between the handwheel and the end bonnet.

As shown, the entrance and exit slots are positioned at diametrically opposed locations in the end bonnets. This permits maximum traversal of the cooling air through each end bonnet.

Figure 3:
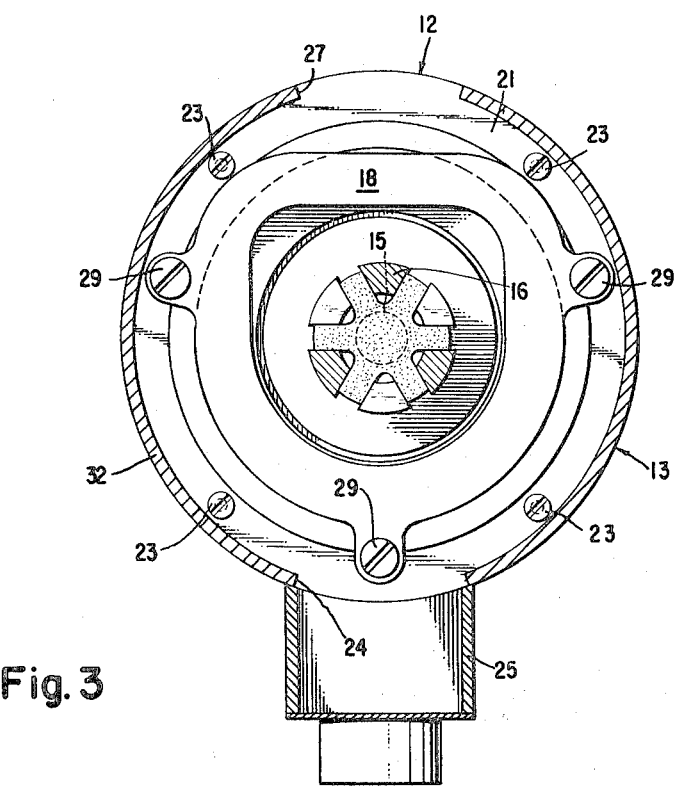
FIG. 3 is an end elevational view of the motor taken along line 3—3 of FIG. 2.

External to the motor and operable independently thereof, is a blower 30. The blower may be conveniently mounted below table 11 by means of a bracket with the outlet connected to hose or conduit 26. Separate control means are desirably provided for the blower so that a stream of cooling air is continuously produced and directed to the end bonnets regardless of intermittent operation of motor 12. Thus, even during those periods of time when the motor is not being operated, a stream of cooling air is being produced by the blower and circulated through the end bonnets and across the faces of the motor end plates as depicted in FIGS. 2 and 3 by the arrows. By providing for a continuous circulation of cooling air in this manner, it has been found that motor case temperatures can be maintained at about 65°C as contrasted with temperatures of at least 100°C, even with the prior motor-driven impeller referred to hereinbefore, both systems being measured at 40 start stops per minute.

From the foregoing, it will be seen that an arrangement has been provided whereby the motor and certain auxiliary sewing machine elements, including the needle position sensor, bobbin winder and handwheel, are so located with respect to a continuously flowing stream of cooling air that the aforementioned problem of heat rise has been effectively dealt with.

It will be understood, of course, that the entrance openings may be formed at any point around the diameter of the motor, the exit openings being preferably positioned at a substantially opposite diametric location. The use of a junction box for the introduction of cooling air is a matter of expediency, since the stream of cooling air may be introduced directly into the end bonnets by the provision of a suitable conduit arrangement.

It will be understood that various changes in the details, materials, arrangements of parts, and operating conditions which have been herein described and illustrated in order to explain the nature of the invention, may be made by those skilled in the art within the principles and scope of the invention.

Having thus set forth the nature of the invention, what is claimed herein is:

1. A method for cooling an enclosed, low-inertia, direct drive sewing machine motor, comprising producing a continuous stream of cooling air by means operable independently of said motor, directing said stream through entrance openings located respectively in end bonnets surrounding each of the motor end plates, causing the stream of cooling air in each end bonnet to flow in close proximity to the motor end plate therein and to exit through another opening in each said end bonnet.

2. A method according to claim 1, wherein said entrance and exit openings are so positioned as to permit said stream of cooling air to traverse the entire extent of said end plates before exiting from the respective end bonnets.

3. A method according to claim 2, wherein said stream of cooling air is directed through an arcuate entrance slot and is exited through an arcuate exit slot.

4. A method according to claim 1, wherein said stream of cooling air is introduced into a manifold chamber and is thence divided into two segments, one of said segments being directed through the entrance slot of one of said end bonnets and the other segment being directed through the entrance slot of the other of said end bonnets.

5. A method according to claim 4, wherein each said segment of cooling air is caused to pass through the end bonnet to which it is introduced in a path whereby motor-driven auxiliary sewing machine assemblies housed therein are cooled thereby.

6. In a direct drive sewing machine having means associated therewith for cooling the low-inertia driving motor, said motor being of the sealed type and mounted on the longitudinal arm of the machine such that the shaft of said motor is coupled operatively to the main machine drive shaft, and said motor being provided with a pair of opposed end plates in which said motor shaft is rotatably carried, the combination of an end bonnet enclosing each of said end plates and provided at diverse locations with cooling air entrance and exit openings, a blower external of said motor and operable independently thereof so as to supply a continuous stream of cooling air to each of said end bonnets regardless of intermittent operation of said motor, and cooling air distribution means connecting said blower with the entrance openings of said end bonnets.

7. A direct drive sewing machine according to claim 6, wherein said entrance and exit openings are positioned at substantially opposed locations in said end bonnets.

8. A direct drive sewing machine according to claim 6, wherein the entrance opening of each said end bonnet comprises an arcuate slot located adjacent the end plate enclosed by said end bonnet, the exit opening of each said end bonnet comprising an arcuate slot located adjacent the diametrically opposed portion of said end plate.

9. A direct drive sewing machine according to claim 6, wherein said cooling air distribution means includes a junction box for said motor at one end to the lower sections of said end bonnets and communicating at said end with the entrance slots of said end bonnets, conduit means being connected at the other end of said junction box with the outlet of said blower.

10. A direct drive sewing machine according to claim 6, wherein the means for coupling said motor shaft to the main drive shaft of the machine and a braking mechanism for said motor shaft are housed in one of said end bonnets in a location whereby it is cooled by said cooling air stream, the bobbin winder of said machine being carried by said one end bonnet, and a needle position sensor assembly adapted to sense the vertical position of the sewing machine needle is housed within the other of said end bonnets in a location whereby it is cooled by said cooling air stream.

* * * * *